(12) United States Patent
Klein

(10) Patent No.: US 11,538,274 B1
(45) Date of Patent: Dec. 27, 2022

(54) PALM VEIN IDENTIFICATION SYSTEM, APPARATUS, AND METHOD

(71) Applicant: Jackson Klein, Emeryville, CA (US)

(72) Inventor: Jackson Klein, Emeryville, CA (US)

( * ) Notice: Subject to any disclaimer, the term of this patent is extended or adjusted under 35 U.S.C. 154(b) by 0 days.

(21) Appl. No.: 17/167,914

(22) Filed: Feb. 4, 2021

Related U.S. Application Data

(60) Provisional application No. 62/943,591, filed on Dec. 4, 2019, provisional application No. 62/943,578, filed on Dec. 4, 2019, provisional application No. 62/943,580, filed on Dec. 4, 2019, provisional application No. 62/943,593, filed on Dec. 4, 2019, provisional application No. 62/943,585, filed on Dec. 4, 2019.

(51) Int. Cl.
*G06V 40/12* (2022.01)
*G06V 40/50* (2022.01)

(52) U.S. Cl.
CPC ...... *G06V 40/1365* (2022.01); *G06V 40/1335* (2022.01); *G06V 40/50* (2022.01)

(58) Field of Classification Search
None
See application file for complete search history.

(56) References Cited

U.S. PATENT DOCUMENTS

2015/0213321 A1* 7/2015 Okazaki ................. G06V 40/13
382/116

* cited by examiner

*Primary Examiner* — Nicholas J Lee
(74) *Attorney, Agent, or Firm* — Leavitt Eldredge Law Firm

(57) ABSTRACT

A palm vein identification system includes a palm vein scanning device to capture a scan of a vein pattern of a candidate; the database having a groups, each group having a records, each records associated with a candidate record; the server having a processing unit to receive the scan from the communication system; create an image file associated with the scan; determine which of the groups the scan fits into; and narrow down a match associated with the scan based on which of the groups the scan fits into; the server authenticates the candidate based on the match.

4 Claims, 18 Drawing Sheets

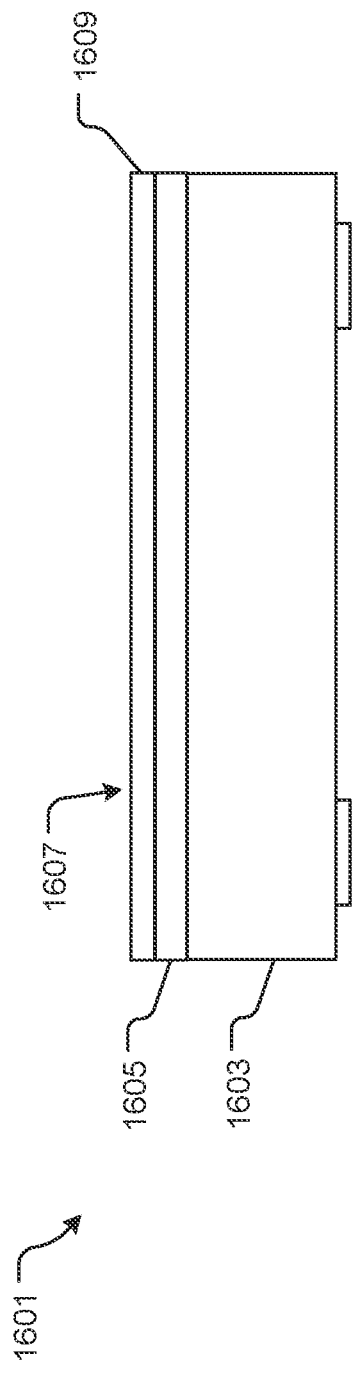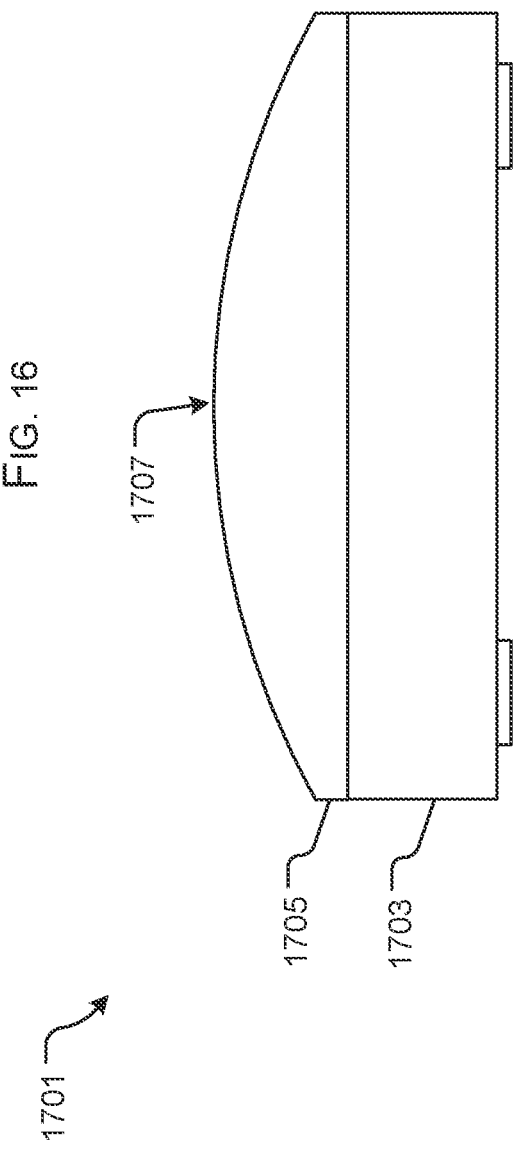

PALM VEIN IDENTIFICATION SYSTEM, APPARATUS, AND METHOD

BACKGROUND

1. Field of the Invention

The present invention relates generally to systems and methods that utilize palm vein identification, and more specifically, to a palm vein identification system that uses a rating method with a plurality of groupings to narrow down likely candidate matches, thereby improving speed, accuracy, and scalability of palm vein identification.

2. Description of Related Art

Palm vein identification is a technology that is currently developing in the art. Palm vein recognition is a biometric technology that is configured to authenticate a person on a basis of vein pattern recognition, as each person has a unique vein pattern associated with their hands. In FIG. 1, a flowchart 101 of a conventional method is shown. General systems utilize a scanning device, wherein an image of the person's veins is captured and analyzed to create a record, as shown with boxes 103, 105. On a subsequent use, the person will re-scan their hand, wherein the image is then transmitted into data that can be compared to a database to determine authentication of the person, as shown with boxes 107, 109.

Typical palm scanners illuminates and scan the person's palm using near-infrared light, which is absorbed by deoxygenated blood flowing through the person's veins. The light is reflected back, causing the veins to appear black, thereby allowing for a quality image to be captured by the camera of the scanner.

It should be appreciated that there are many benefits to the use of palm vein identification systems. Namely, it should be appreciated that palm vein patterns differ markedly from one individual to another. In addition, the scans rely on blood flowing through the person, which ensures a living individual is recognized. Yet further, conventional scanners do not require contact by the user, thereby making them hygienic and suitable for high volume use.

However, despite the advantages, there is room for improvement in the field of palm vein identification. Specifically, there it is desirable to provide improvements that can increase accuracy, reduce time, and therefore improve overall efficiency associated with palm vein identification.

It is an object of the present invention to provide a system that has a palm vein identification system that utilizes a rating method with a plurality of groups, wherein a candidate's scan is matched to one or more groups, thereby narrowing down the potential matches.

Accordingly, although great strides have been made in the area of palm vein identification systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 16 is a simplified side view of an exemplary embodiment of the apparatus of FIG. 15;

FIG. 17 is a simplified side view of an alternative exemplary embodiment of the apparatus of FIG. 15;

Figure 1:
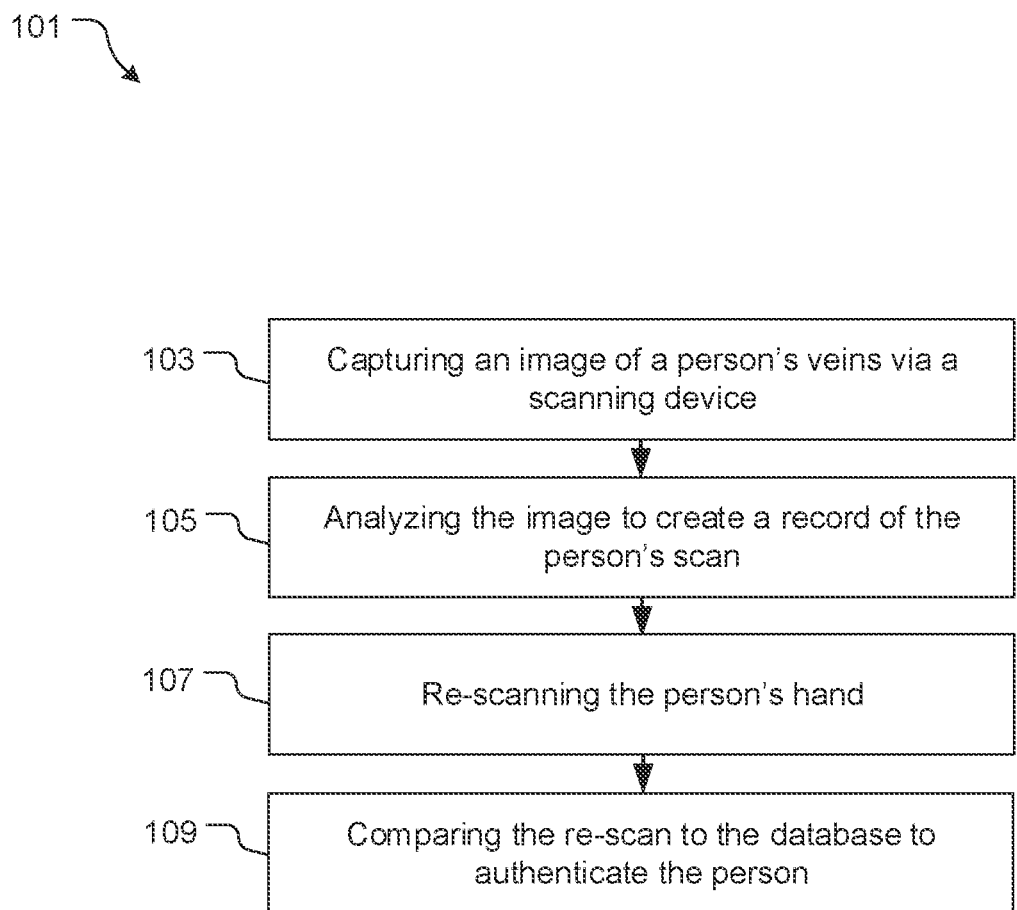
FIG. 1 is a flowchart of a method conventional of palm vein identification.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional palm vein identification systems. Specifically, the present invention provides for an authentication system that matches a scan to one or more groups of a plurality of groups, thereby narrowing down a potential candidate match. This feature helps improve efficiency associated with a palm vein identification system. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
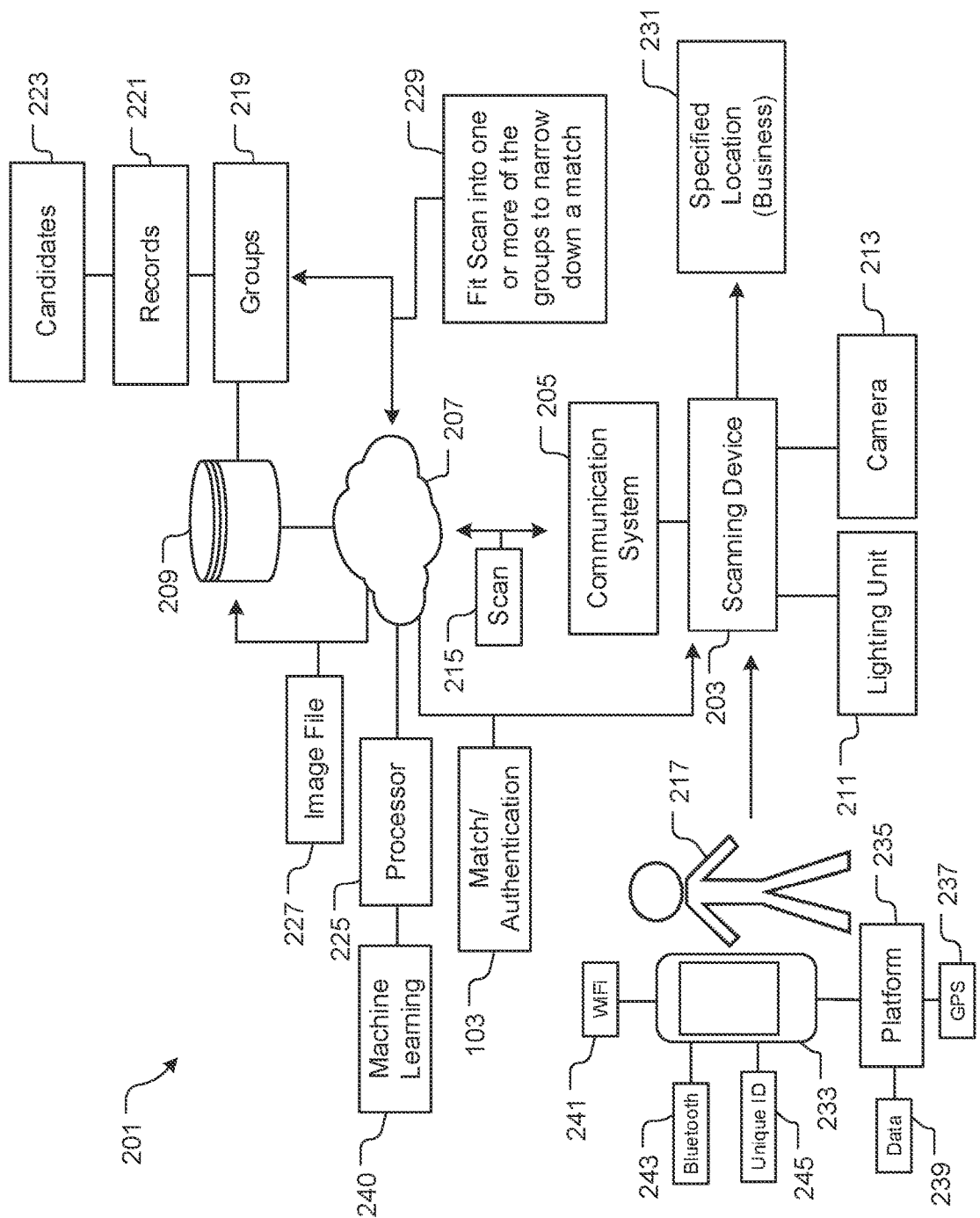
FIG. 2 is a schematic of a palm vein identification system in accordance with a preferred embodiment of the present application.

Referring now to the drawings wherein like reference characters identify corresponding or similar elements throughout the several views, FIG. 2 depicts a schematic of a palm vein identification system 201 in accordance with a preferred embodiment of the present application. It will be appreciated that system 201 overcomes one or more of the above-listed problems commonly associated with conventional palm vein identification systems.

In the contemplated embodiment, system 201 includes a palm vein scanning device 203, the palm vein scanning device 203 having a communication system 205 configured to electronically communicate with a server 207 and a database 209. The scanning device 203 can be any palm vein scanning device known in the art or developed in the future, the device having a lighting unit 211 and a camera 213, wherein the lighting unit and camera are configured to capture a scan 215 of a vein pattern of a candidate 217.

As shown, the database 209 includes the database having a plurality of groups 219, each group having a plurality of records 221, each of the plurality of records associated with a candidate record 223. It should be appreciated that the database is continuously updated overtime as additional candidates become part of the system. In an initial set up, a candidate will scan their palm to create their record, which may or may not be associated with a profile.

In the preferred embodiment, the server 207 includes a processing unit 225, the processing unit configured to receive the scan 215 from the communication system 205 and create an image file 227. The server 207 and processor 225 will proceed to compare the image file 227 with the plurality of records of each of the groups 219, thereby determining which groups the image file 227 fits into, 229. This information will narrow down the possibility of matching candidates in an efficient manner. It should be appreciated that the matching of groups can be crossed reference to even further narrow down the potential matches. Based on the determination the analysis and comparison, the server with authenticate 103 the candidate.

In some embodiments, the scanning device 203 will be specifically associated with a specified location 231, such as a place of business. For example, the scanning device 203 may be a payment authentication device associated with a business.

In some embodiments, the candidate 217 further is associated with a computing device 233, such as a mobile phone, wherein the computing device 233 can provide access to a platform 235. It should be appreciated that the features of the platform can vary, such as the inclusion of a GPS chip 237, and data 239. In some embodiments, the data 239 is specifically associated with candidate habits, such as shopping, and in yet other embodiments, one or more machine learning algorithms 240 can be used with said data.

The computing device 233 can further include a WiFi chip 241, Bluetooth chip 243, and a unique ID 245, all of which can assist in placing the candidate in one or more groups, as will be discussed herein.

It should be appreciated that one of the unique features believed characteristic of the present application is the matching of a scan to one or more groups as opposed to a direct match with a candidate. This feature helps create improved accuracy and efficiency associated with vein pattern identification.

Figure 3:
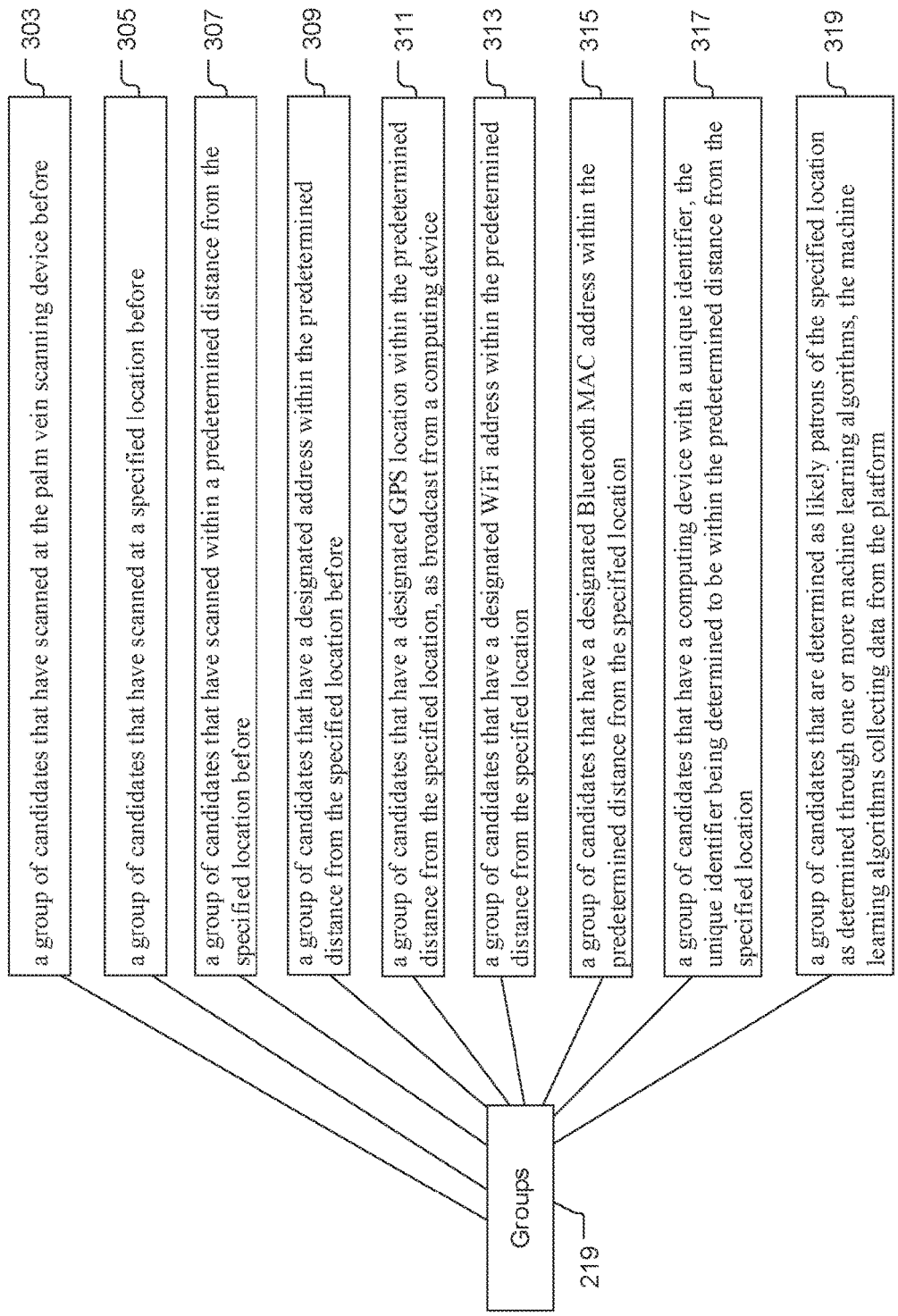
FIG. 3 is a chart of a first set of a plurality of groups associated with the system of FIG. 2.

In FIG. 3, a first chart depicts a first set of groups contemplated as part of the plurality of groups 219. Such groups can include one or more of: a group of candidates that have scanned at the palm vein scanning device before 303; a group of candidates that have scanned at a specified location before 305; a group of candidates that have scanned within a predetermined distance from the specified location before 307; a group of candidates that have a designated address within the predetermined distance from the specified location before 309; a group of candidates that have a designated GPS location within the predetermined distance from the specified location, as broadcast from a computing device 311; a group of candidates that have a designated WiFi address within the predetermined distance from the specified location 313; a group of candidates that have a designated Bluetooth MAC address within the predetermined distance from the specified location 315; a group of candidates that have a computing device with a unique identifier, the unique identifier being determined to be within the predetermined distance from the specified location 317; and a group of candidates that are determined as likely patrons of the specified location as determined through one or more machine learning algorithms, the machine learning algorithms collecting data from the platform 319.

Figure 4:
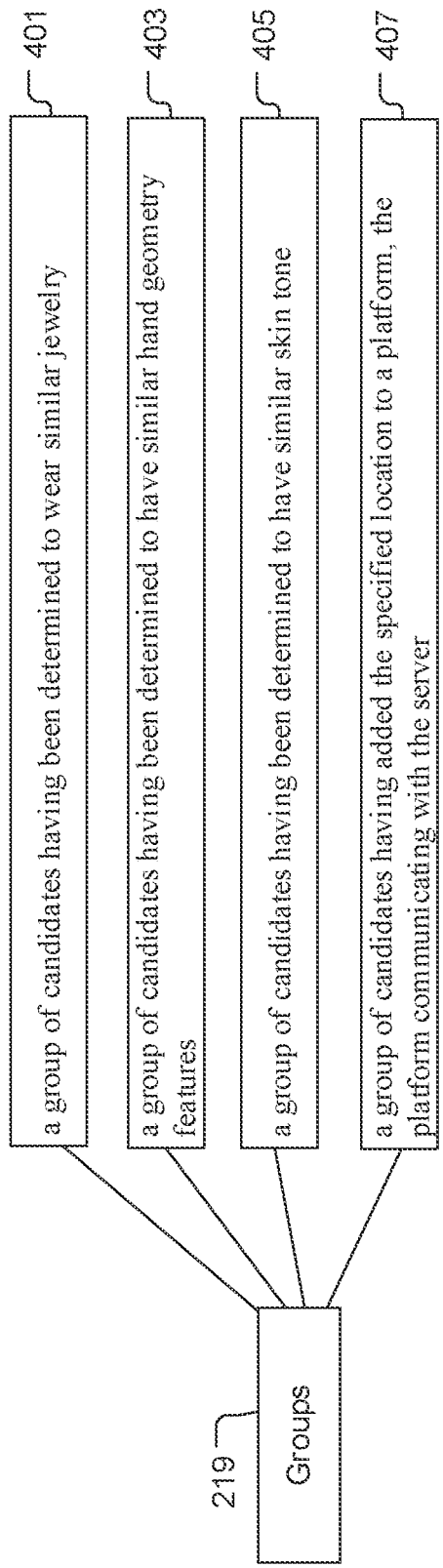
FIG. 4 is a chart of a second set of a plurality of groups associated with the system of FIG. 2.

In FIG. 4, a second chart depicts a second set of groups contemplated as part of the plurality of groups 219. Such groups can include one or more of: a group of candidates having been determined to wear similar jewelry 401, such as similarities in location of jewelry and quantity of jewelry; a group of candidates having been determined to have similar hand geometry features 403, such as absolute finger length, relative finger lengths, palm width, palm height, and palm width/height ration; a group of candidates having been determined to have similar skin tone 405; and a group of candidates having added the specified location to a platform, the platform communicating with the server 407.

Figure 5:
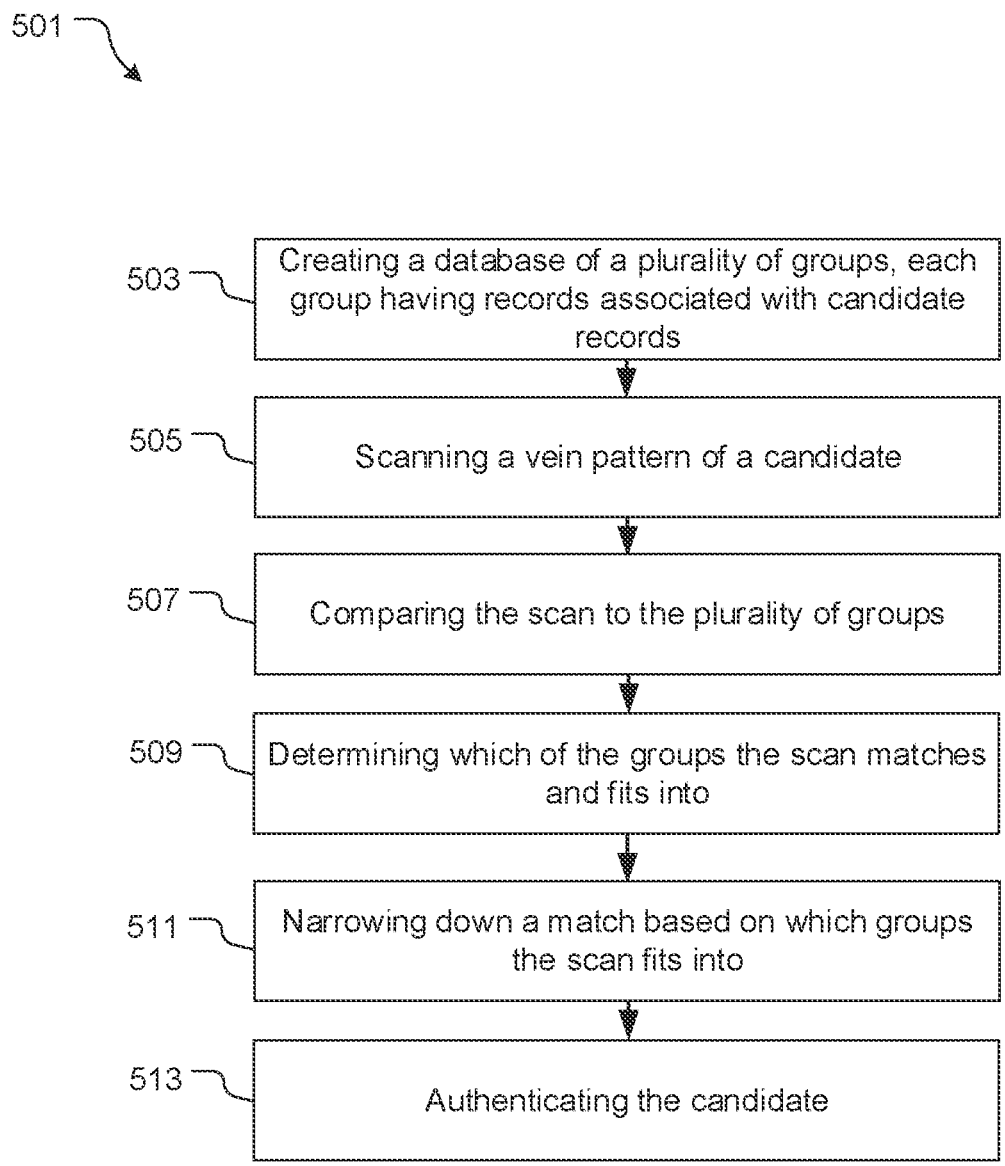
FIG. 5 is a flowchart of a method of use of the system of FIG. 2.

In FIG. 5, a flowchart 501 summarizes the method associated with system 201. During use, the database having a plurality of groups is created, as shown with box 503. A candidate to be authenticated proceeds to scan their palm, wherein an image is created to compare to the plurality of groups, as shown with boxes 505, 507. Which of the groups the scan fits into is determined, as shown with box 509. The system will then narrow down the number of potential matches based on which groups the scan falls into, as shown with box 511. Then the candidate can be authenticated efficiently, as shown with box 513.

Figure 6:
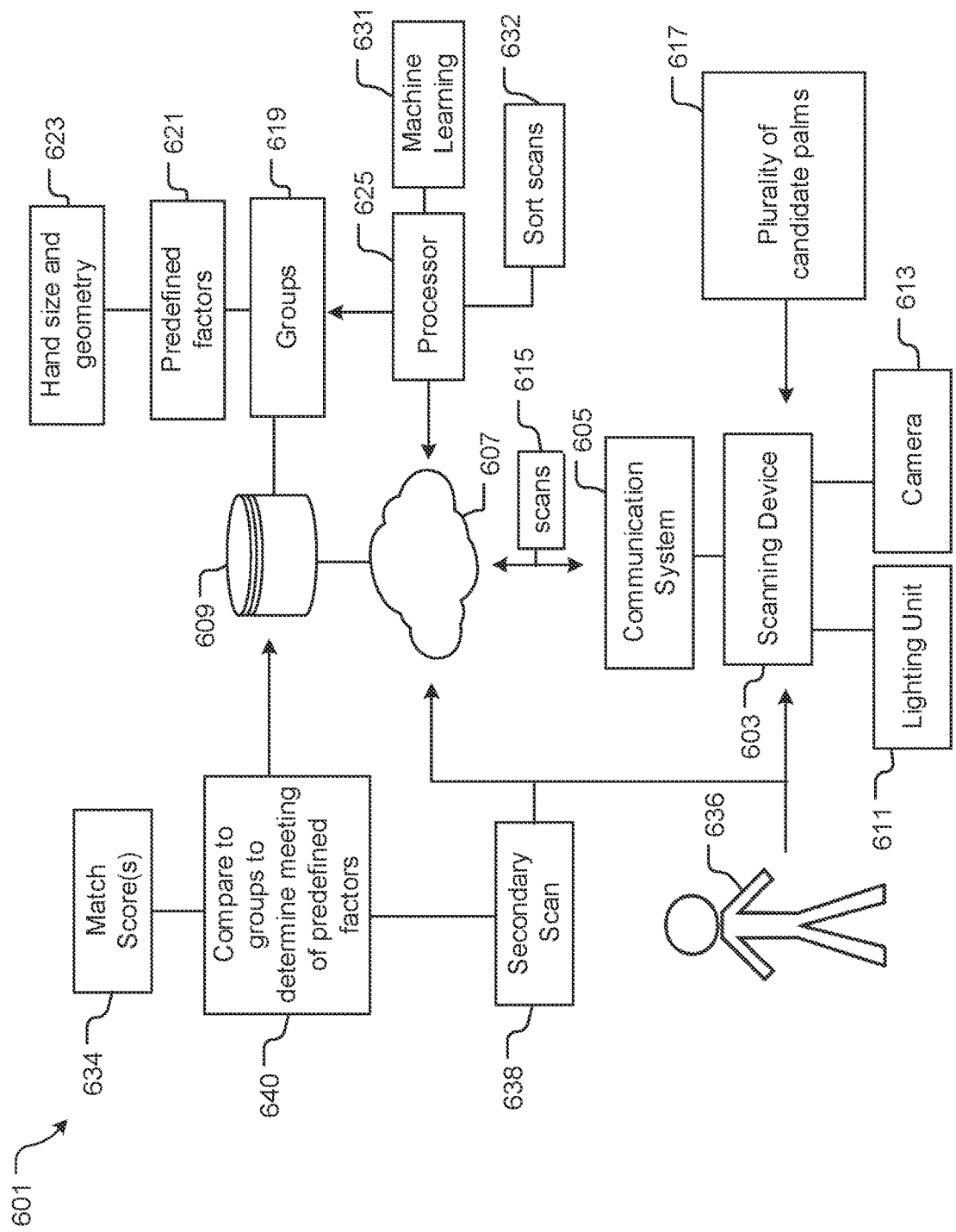
FIG. 6 is a schematic of an alternative embodiment of a palm vein identification system in accordance with the present application.
Figure 7:
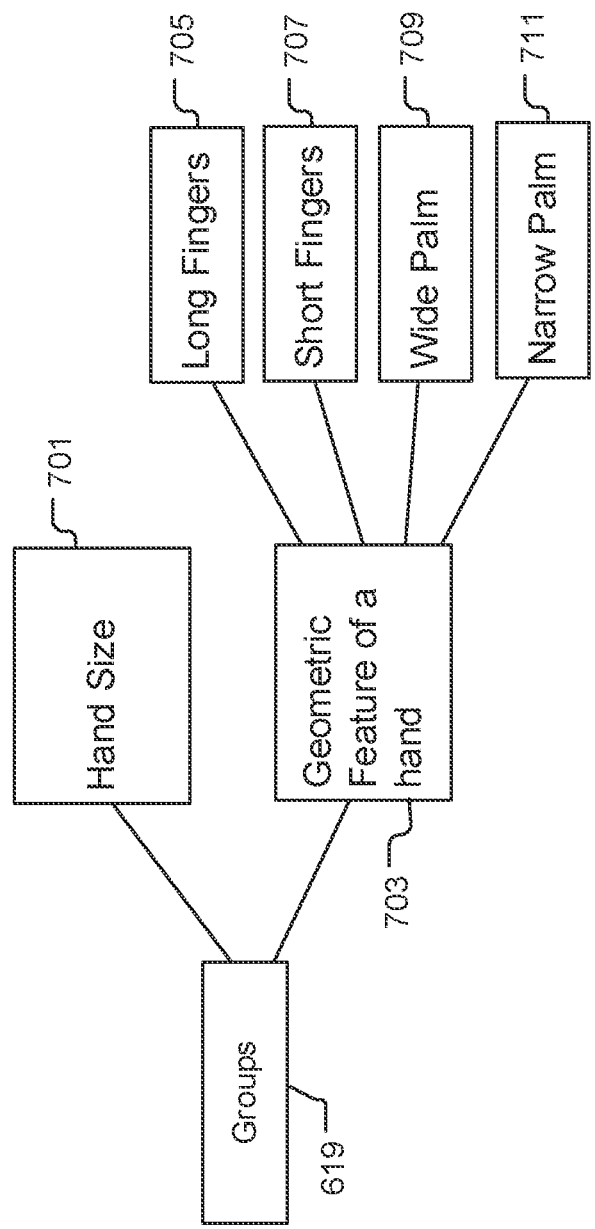
FIG. 7 is a chart of a plurality of groups and predefined factors associated with the system of FIG. 6.
Figure 8:
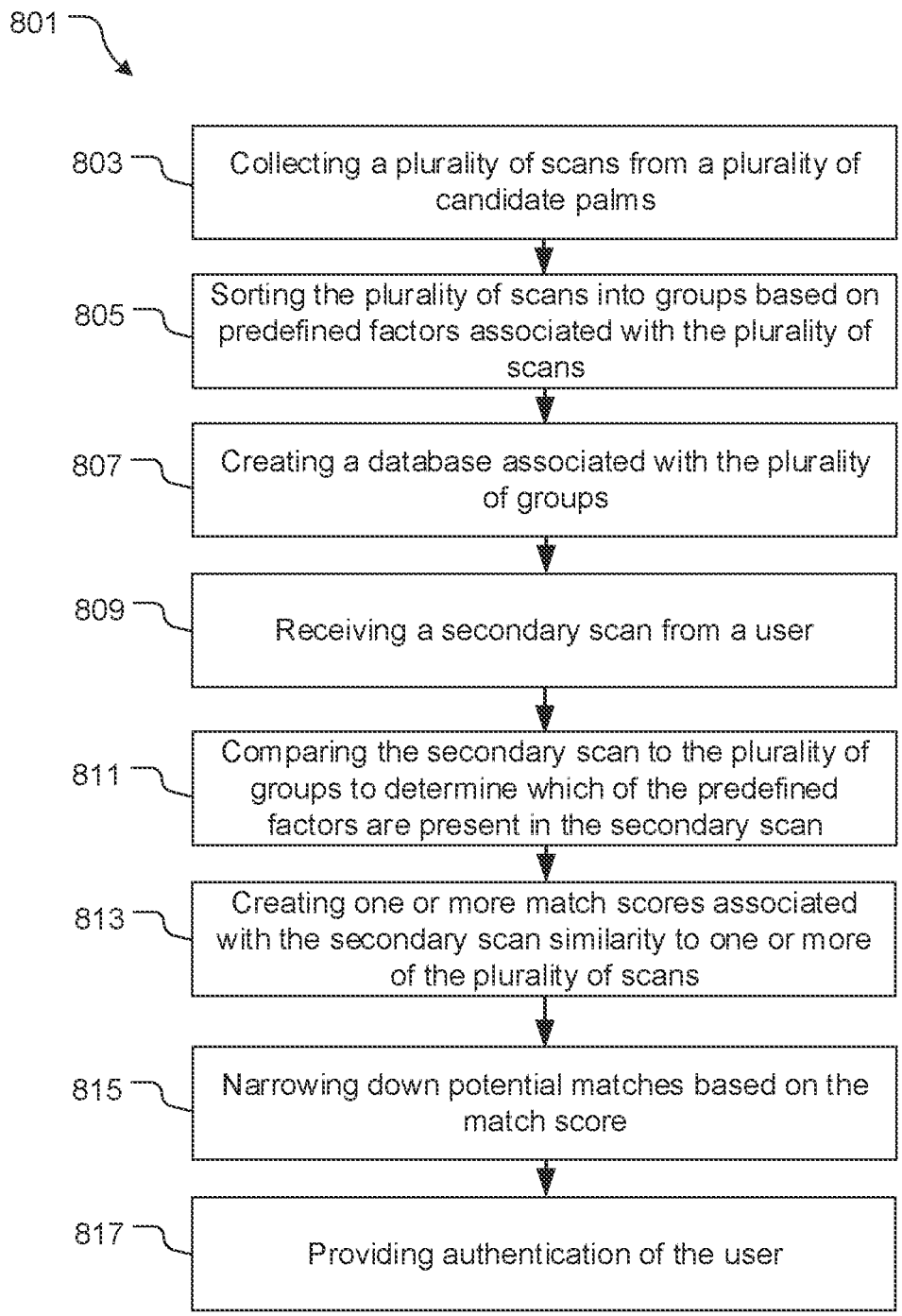
FIG. 8 is a flowchart of a method of use of the system of FIG. 6.

Referring now to FIGS. 6 through 8, an alternative embodiment of a palm vein identification system in accordance with the present application is shown and discussed.

In this contemplated embodiment, system 601 includes a palm vein scanning device 603, the palm vein scanning device 603 having a communication system 605 configured to electronically communicate with a server 607 and a database 609. The scanning device 603 can be any palm vein scanning device known in the art or developed in the future, the device having a lighting unit 611 and a camera 613, wherein the lighting unit and camera are configured to capture a scans 615 of a plurality of candidate palms 617.

As shown, the database 609 includes a plurality of groups 619, each group including a portion of the plurality of scans 615 that meet one or more predefined factors 621, such as hand size and/or geometry 623. It should be appreciated that during this initial set up, the plurality of candidate palms is used to generate the groups with predefined factors. A processor 625 which can utilize one or more algorithms, such as machine learning 631 is configured to sort the scans 632, thereby establishing the groups, which can continuously be updated and changed.

It should be appreciated that one of the unique features believed characteristic of the present application is the creation of a match score 634 utilizing the predefined factors 621 and groups 619. It should be appreciated that during use, a user 636 will utilize the scanning device 603 or another device, to create a secondary scan 638 of the user's palm. This secondary scan 638 is provided to the server 607 and/or processor 625, wherein the secondary scan is compared to the groups 640 to determine which of the predefined factors the secondary scan matches to. This allows for creation of one or more match scores 634 between the secondary scan and one or more of the plurality of scans 615.

It must be understood and appreciated that this feature of creating a match score allows for the system to narrow down the number of potential matches based on the secondary scan meeting a certain level of similarity just based off a few predefined factors. This narrows the pool of potential matches to a manageable level for authentication of the user 636. It is contemplated that the match score may be weighted, and the calculation for the match score can be improved over time based on artificial intelligence, machine learning, or the like.

In FIG. 7, a chart depicts an example of predefined factors that can be used in the system of the present invention. It should be appreciated and understood that the predefined factors can be changed, updated, or the like, while still providing the same functionality. As shown, some examples of predefined factors can be hand size 701 and geometric features of a hand 703. For example, if the user's secondary scan is determined to be a large hand, as predefined within the system, the system can automatically eliminate all potential matches that have a small hand, as predefined within the system. Such a correlation will increase the user's match score with all the plurality of scans that have been determined to have large hands. Some geometric features that may be considered are: a determination that the hand has long fingers 705, short fingers 707, a wide palm 709, and a narrow palm 711.

In FIG. 8, a flowchart 801 summarizes the method associated with system 601. During use, a collection of a plurality of scans from a plurality of candidate palms is made, as shown with box 803. It should be appreciated that this collection can be increased and changed over time. The plurality of scans is then sorted based on predefined factors, such as hand size, into one or more groups, as shown with box 805. Again, the groups may shift and change over time as data is improved and analyzed. A database is established, as shown with box 807.

For authentication of a user, a user's scan will be taken, as shown with box 809. It should be appreciated that this may be in order for the user to access a service, purchase a product, or any other environment where user authentication is desired. The system will then proceed to compare the secondary scan to the plurality of groups, determining which of the predefined factors the secondary scan possesses, as shown with box 811. For example, the system may determine that the secondary scan is of a narrow palm with long fingers. Based on this information, the system will create a match score associated with one or more of the plurality of initial scans, as shown with box 813. For example, a user with a narrow palm and long fingers will have a higher match score with initial scans that were determined to be both narrow palm and longer finger candidates then the user will have with initial scans that were determined to be of narrow palms and short fingers. In addition, it should be appreciated that the match score will be lower (considered a non-match) to initial scans where the predefined factors do not match, for example, with initial scans that are wide palms and short fingers.

The match score(s) will be used to narrow the pool of potential authentication matches, as shown with box 815. The system will be able to search for a match based both high and low match scores, wherein the system will utilize this information to determine where additional computing resources need to be invested to determine a match. Upon a match, authentication can be provided, as shown with box 817. It should be appreciated that the match score will be weighted such that groups of potential matches are established from a high probability match, a medium probability match, and a low probability match. This allows for efficient matching, wherein computing resources are invested efficiency as potential matches are narrowed down.

Figure 9:
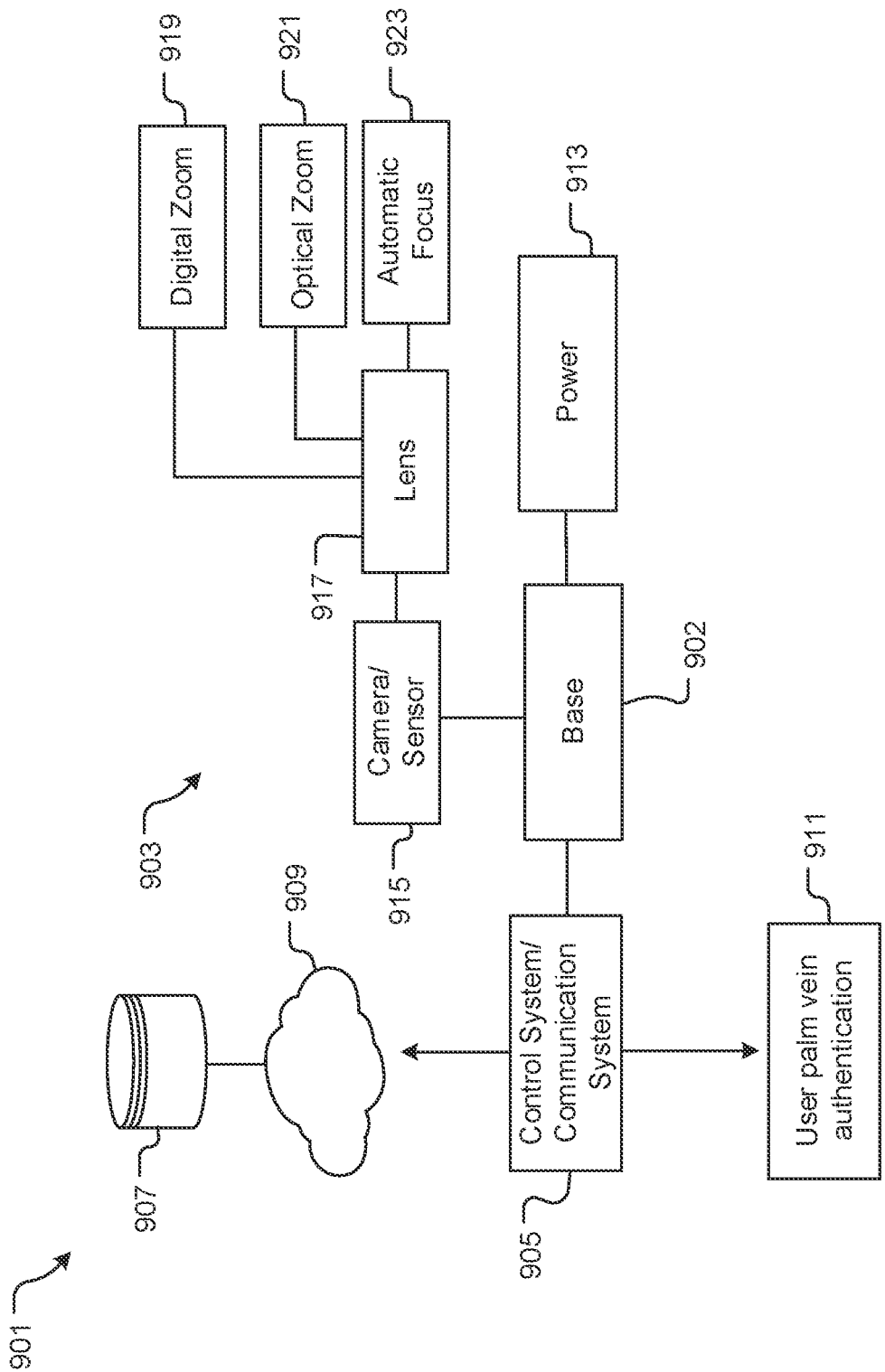
FIG. 9 is a schematic of a palm vein identification apparatus in accordance with a preferred embodiment of the present application.
Figure 10:
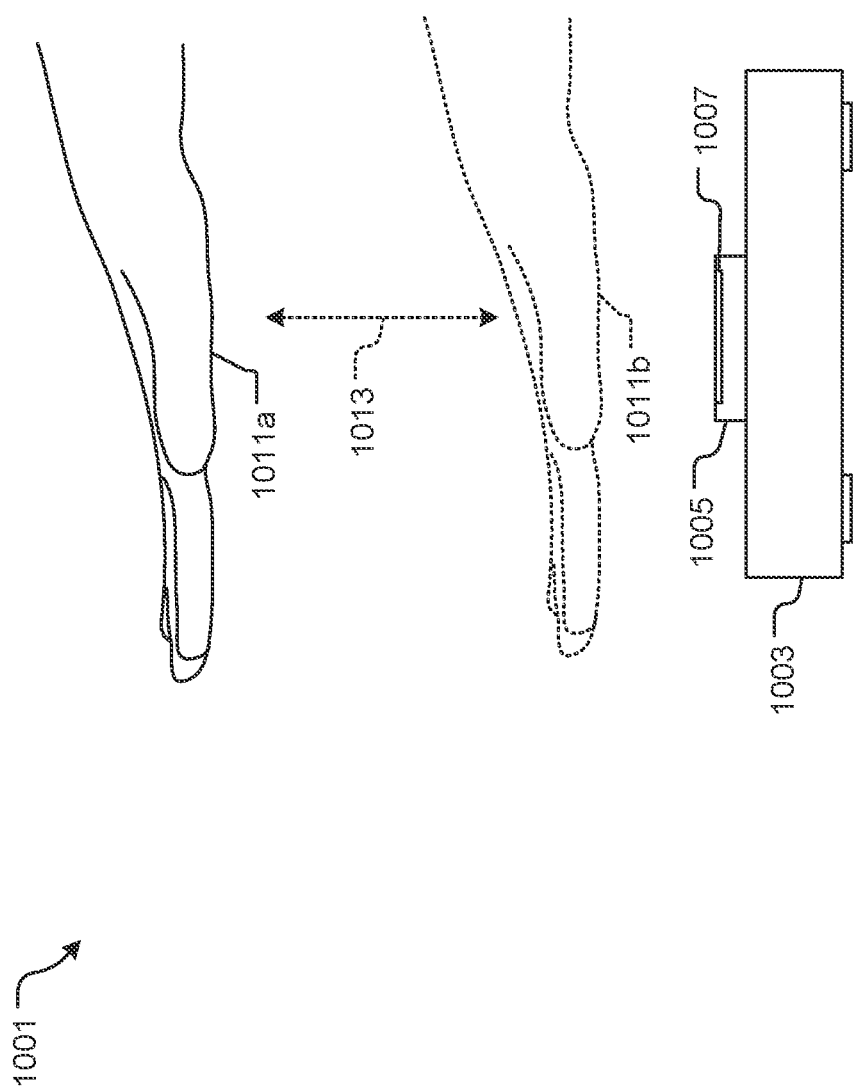
FIG. 10 is a simplified side view of an exemplary embodiment of the apparatus of FIG. 9.
Figure 11:
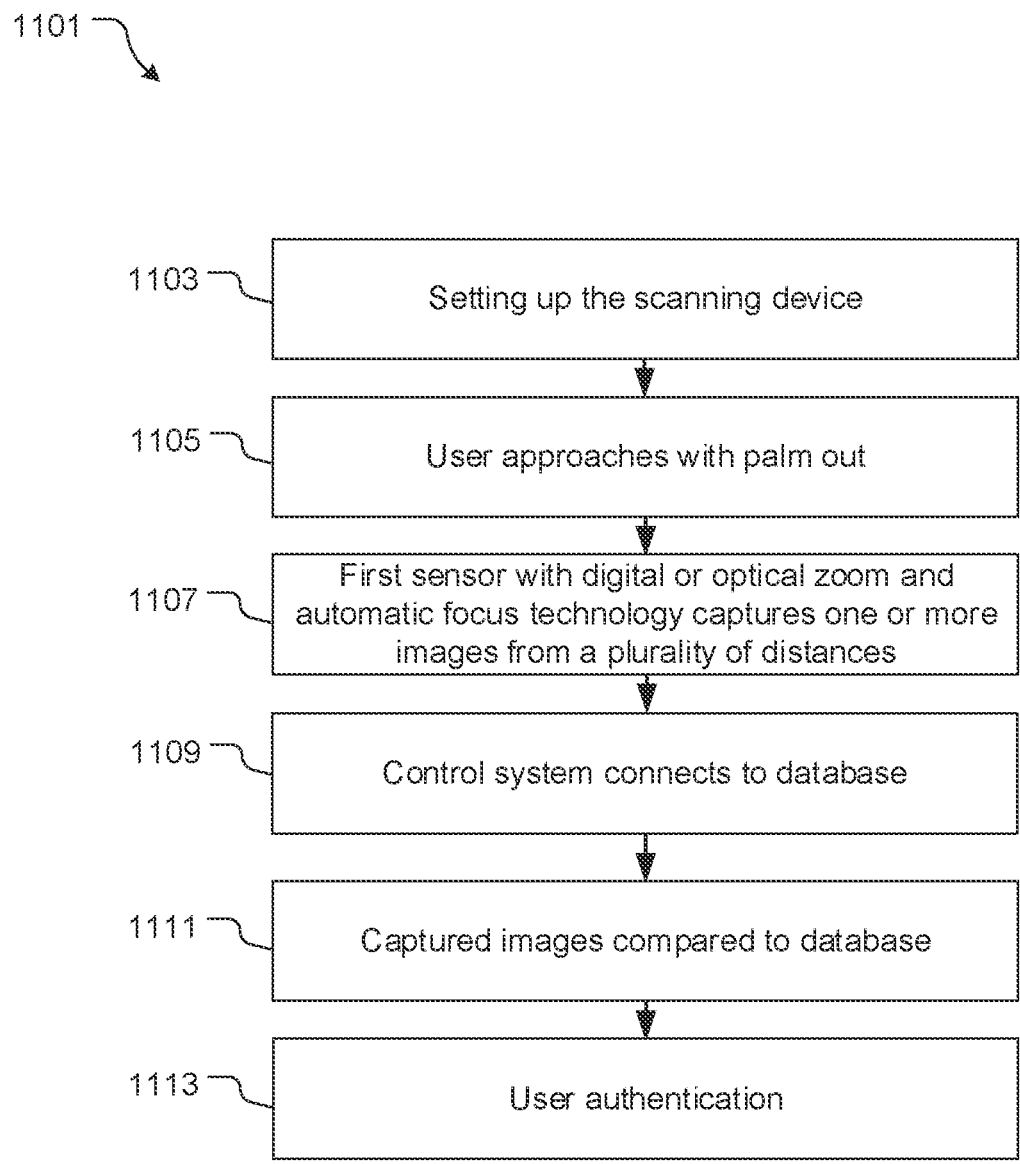
FIG. 11 is a flowchart of a method of use of the system of FIG. 9.

In FIGS. 9 through 11, a first embodiment of a palm vein identification apparatus is shown in accordance with the present application.

In the contemplated embodiment, as shown in FIG. 9, system 901 includes a palm vein scanning apparatus 903, the palm vein scanning apparatus 903 having a control/communication system 905 configured to provide electronic communication and data collection as needed. As shown, the control system 905 is configured to communicate with a database 907 via a server 909, thereby providing for comparison of one or more scans to the database for user authentication, 911.

One of the unique features believed characteristic of the present application is the incorporation of a first sensor 915, which can be a camera, the first sensor 915 having a lens 917 with a high powered zoom, such as a digital zoom 919 or optical zoom 921, as well as an automatic focus 923. It should be appreciated that this feature provides for improved image collection from a plurality of distances. It should be appreciated that the base can vary in shape, size, and the like as needed based on aesthetical, functional, or manufacturing considerations. The base 902 is merely a structural component to support the necessary hardware to create the functionality and further to connect to a power source 913 as needed.

During operation, the system is configured such that the sensor is configured to collect one or more images from a plurality of distances, thereby eliminating the need for the user to place their hand within a very close proximity to the scanner. This data is then fed into the control system 905, wherein the data is used for palm vein identification.

It should be appreciated that the system allows for capturing of palm vein scans without the need for the user to be precise in their placement of their palm. This improves accuracy and efficiency associated with the operation of the system.

In FIG. 10, a simplified side view depicts an exemplary embodiment of a palm vein scanning apparatus 1001 that utilizes the features discussed above. As shown, the apparatus 1001 includes a structural base 1003, the structural base supporting a first sensor 1005 with a lens 1007. The first sensor 1005 configured to capture a scan of a palm 1011a, 1011b from a plurality of distances 1013 via the lens 1007, the lens having a detailed zoom as discussed above. It should again be appreciated that the location, structural features, and arrangement can vary, while still providing the same functionality.

In FIG. 11, a flowchart 1101 depicts the method of use of system 901. During use, the scanning device is set up, the scanning device having the features discussed above, as shown with box 1103. The user will then approach the device with their palm out, wherein the user places their palm over the sensor at a plurality of distances, as shown with box 1105. The sensor will utilize the digital or optical zoom, along with the automatic focus technology, to capture one or more images from a plurality of distances, as shown with box 1107. The images will be compared to a database via a control system, thereby providing for user authentication using palm vein technology, as shown with boxes 1109, 1111, 1113.

Figure 12:
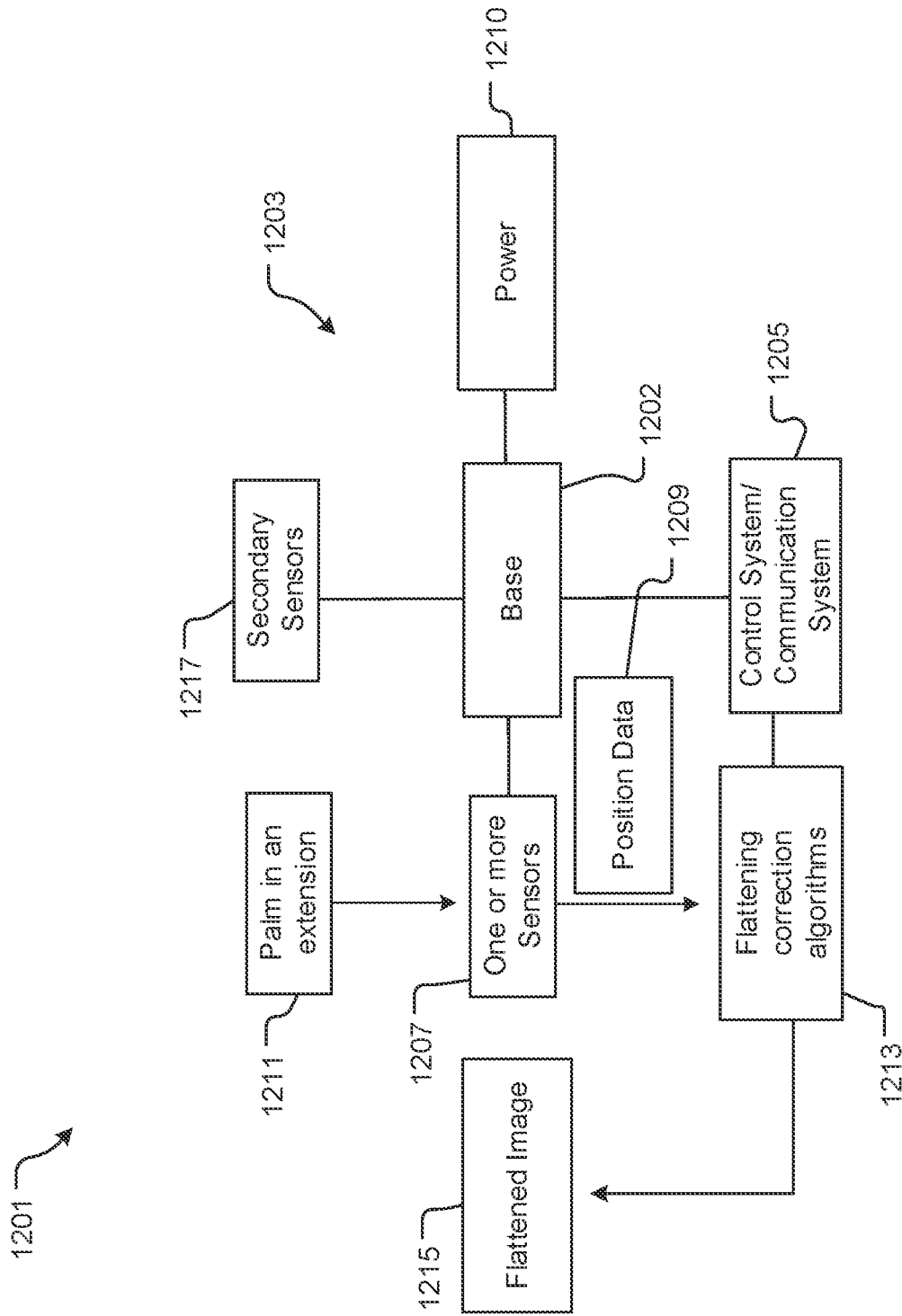
FIG. 12 is a schematic of an alternative embodiment of a palm vein identification apparatus in accordance with the present application.
Figure 13:
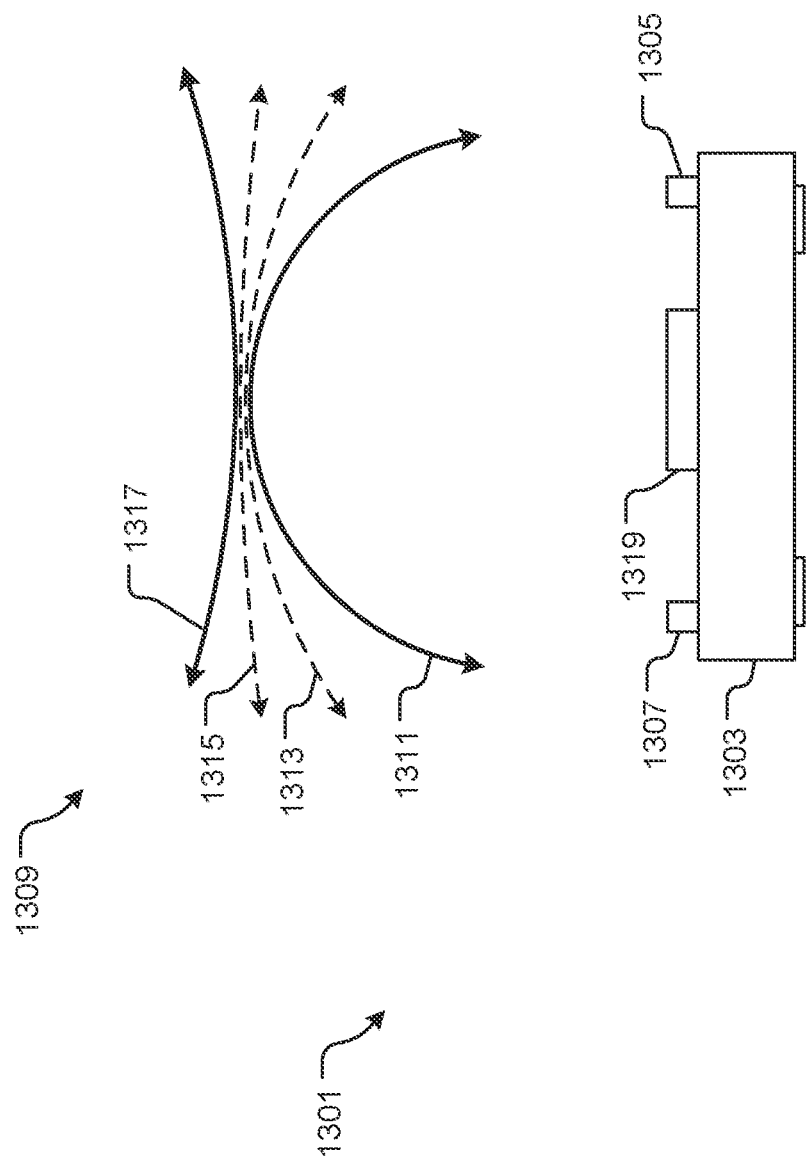
FIG. 13 is a simplified side view of an exemplary embodiment of the apparatus of FIG. 12.
Figure 14:
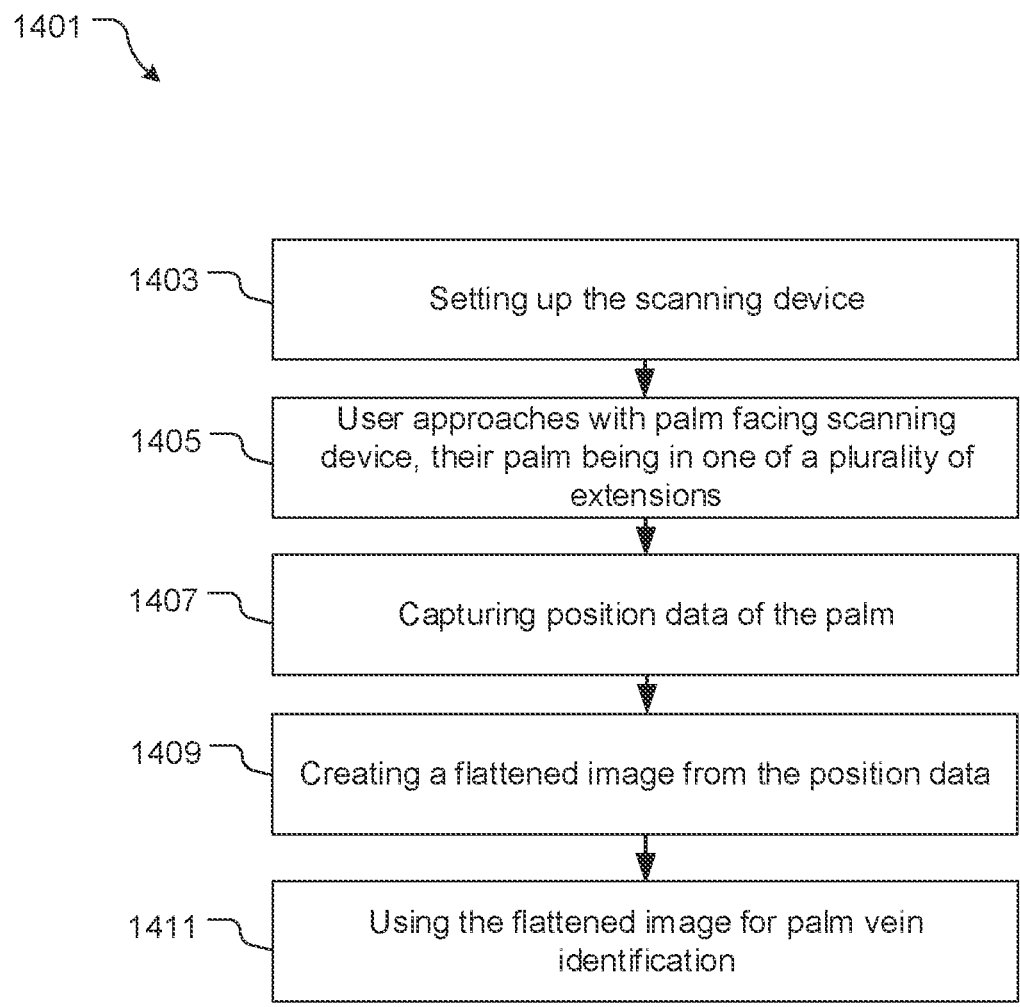
FIG. 14 is a flowchart of the method of use of the system of FIG. 12.

In FIGS. 12-14, a second embodiment of a palm vein identification apparatus is shown.

In this embodiment, system 1201 includes a palm vein scanning apparatus 1203, the palm vein scanning device 1203 having a control/communication system 1205 configured to provide electronic communication and data collection as needed.

The base 1203 is configured to support one or more sensors 1207, the one or more sensors configured to collect position data 1209 from capturing images of a palm in one of a plurality of extensions 1211. It should be appreciated that the one or more sensors 1207 can be secured to the base via a variety of means and positions, and further, the one or more sensors can vary such as being cameras. The base 1202 is merely a structural component to support the necessary hardware to create the functionality and further to connect to a power source 1210 as needed.

One of the unique features believed characteristic of the present application is the ability of the one or more sensors to capture position data, wherein the position data is used in palm vein identification. During use, the position data is transmitted to the control system 1205, wherein one or more flattening correction algorithms 1213 are configured to create a flattened image 1215, the flattened image being configured for use in palm vein identification.

It is contemplated that in some embodiments, additional secondary scanners 1217 could be incorporated into the system, wherein the secondary scanners 1217 may be used to capture additional images of the palm to provide palm vein identification independent of the one or more sensors. For example, it is contemplated that a collection of sensors can work together, wherein some sensors provide for position data, and others provide for palm vein image capturing.

In FIG. 13, a simplified side view depicts an exemplary embodiment of a palm vein scanning apparatus 1301 that utilizes the features discussed above. As shown, the apparatus 1301 includes a structural base 1303, the structural base supporting one or more sensors 1305, 1307. As shown, the system is configured to work with a palm 1309 (represented by lines) that approaches in a variety of extensions 1311, 1313, 1315, 1317. It should be appreciated that an extension is defined as a position somewhere between being fully cupped 1311 and being over extended 1317. The ability of the one or more sensors to determine what position the palm is in, allows for the control system to flatten one or more images for use during the palm vein verification/identification process.

It should again be appreciated that the feature described above increases the efficiency and ease of use associated with using a palm vein identification device. For example, the user will not have to approach with a perfectly flat palm in order to utilize the device.

As further shown, it is again contemplated that additional secondary sensors 1319 can be incorporated into the system as desired and needed, wherein the collection of sensors work together with the control system to both detect position data and collect image data of the palm for verification.

In FIG. 14, a flowchart 1401 depicts the method of use of system 1201. During use, the scanning device is set up, the scanning device having the features discussed above, as shown with box 1403. The user will then approach the device with their palm facing the device, wherein their palm is in one of a plurality of extensions, as shown with box 1405. The one or more sensors will capture position data of the palm, the position data relating to the extension, as shown with box 1407. Based on the position data, the control system and associated algorithms will create one or more flattened images of the user's palm, as shown with box 1409. The flattened image can then be used for palm vein identification and verification, as shown with box 1411.

In FIGS. 15 through 19, another alternative embodiment of a palm vein identification apparatus is shown.

Figure 15:
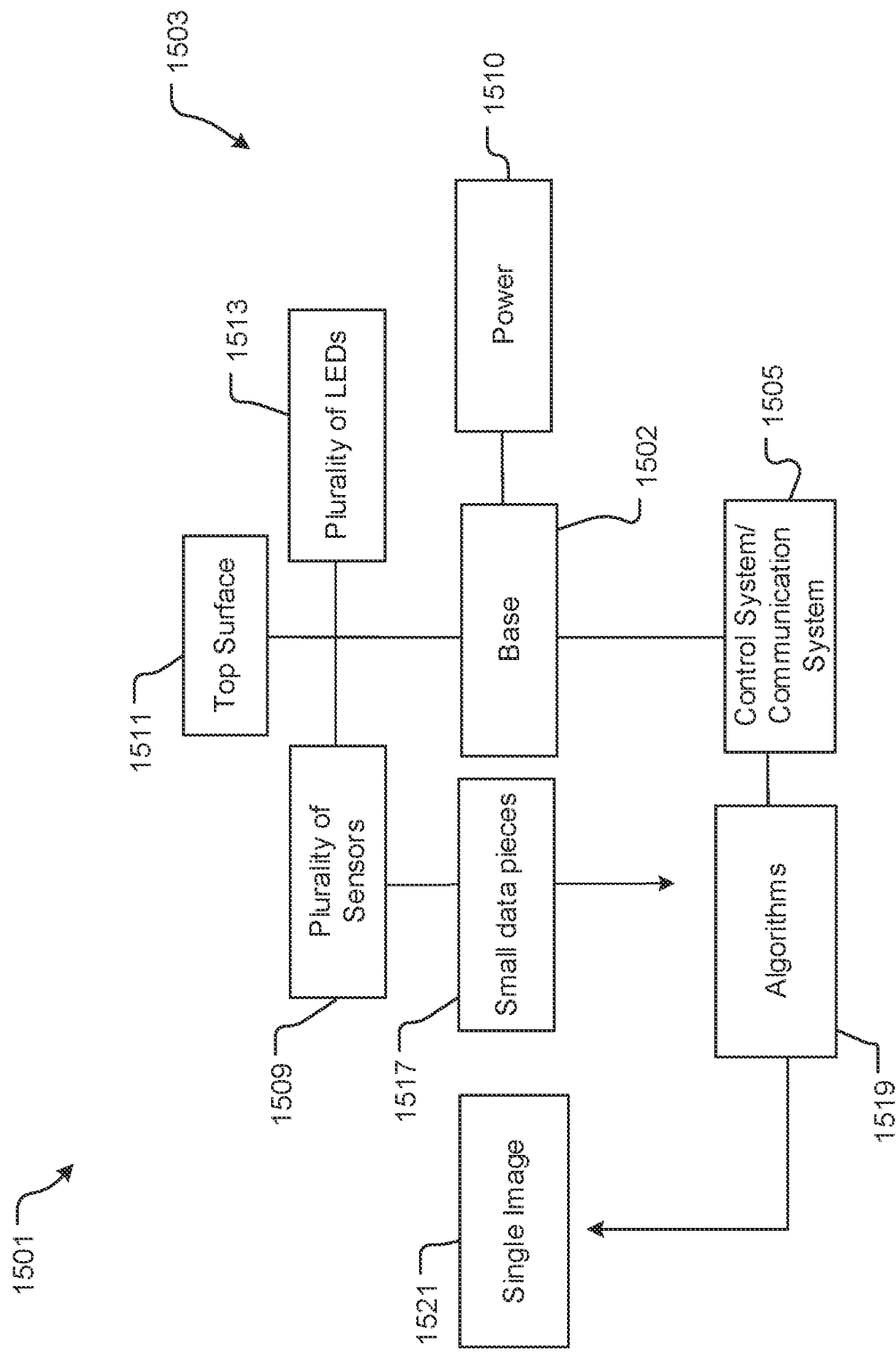
FIG. 15 is a schematic of a third embodiment of a palm vein identification apparatus in accordance with the present application.

In the contemplated embodiment, shown in FIG. 15, system 1501 includes a palm vein scanning apparatus 1503, the palm vein scanning device 1503 having a control/communication system 1505 configured to provide electronic communication and data collection as needed.

The base 1502 is configured to support a sensor system, the sensor system including a plurality of sensors 1509, a top surface 1511, and a plurality of LEDs 1513. It should be appreciated, and is discussed in more detail, that the plurality of sensors can make up the top surface, or in alternative embodiments, the top surface can be composed of a clear material, such as glass, thereby allowing for the sensors to operate through the surface. The top surface being configured to directly receive the user's palm.

It should be appreciated that the style and number of the plurality of sensors 1509 can vary. For example, it is contemplated that hundreds, thousands, or even millions of sensors can be used as needed. The base 1502 is merely a structural component to support the necessary hardware to create the functionality and further to connect to a power source 1510 as needed.

One of the unique features believed characteristic of the present application is the use of a plurality of sensors along with a top surface, wherein the plurality of sensors are each configured to collect a small data piece 1517 from that sensors location in relation to the palm. The control system 1505, along with any necessary algorithms 1519, will receive the small data pieces from the plurality of sensors, wherein the data is used to stitch together a single image 1521 associated with a user's palm vein pattern. The image 1521 can then be used for palm vein identification and verification. It should be appreciated that the feature discussed above allows for a user to place their hand directly on the top surface.

It should further be appreciated that use of a plurality of sensors accounts for the fact that any sensor does not have a wide optical field of view.

In FIGS. 16 and 17, simplified side views depict exemplary embodiments of a palm vein scanning apparatuses 1601, 1701 that utilizes the features discussed above.

As shown, the apparatus 1601 includes a structural base 1603, the structural base supporting a sensor system 1605 which houses a plurality of sensors, LEDs, and a top surface 1607. As shown in this embodiment, the top surface 1607 is created by a separate structural element 1609 such as glass. Further, as shown in this embodiment, the top surface is flat. In FIG. 17, an embodiment 1701 is shown, wherein the structural base 1703 supports sensor system 1705, sensor system 1705 directly creating the top surface 1707, and further wherein the top surface 1707 is curved. It should of course be appreciated that the features of these two embodiments can vary and be interchanged.

Figure 18:
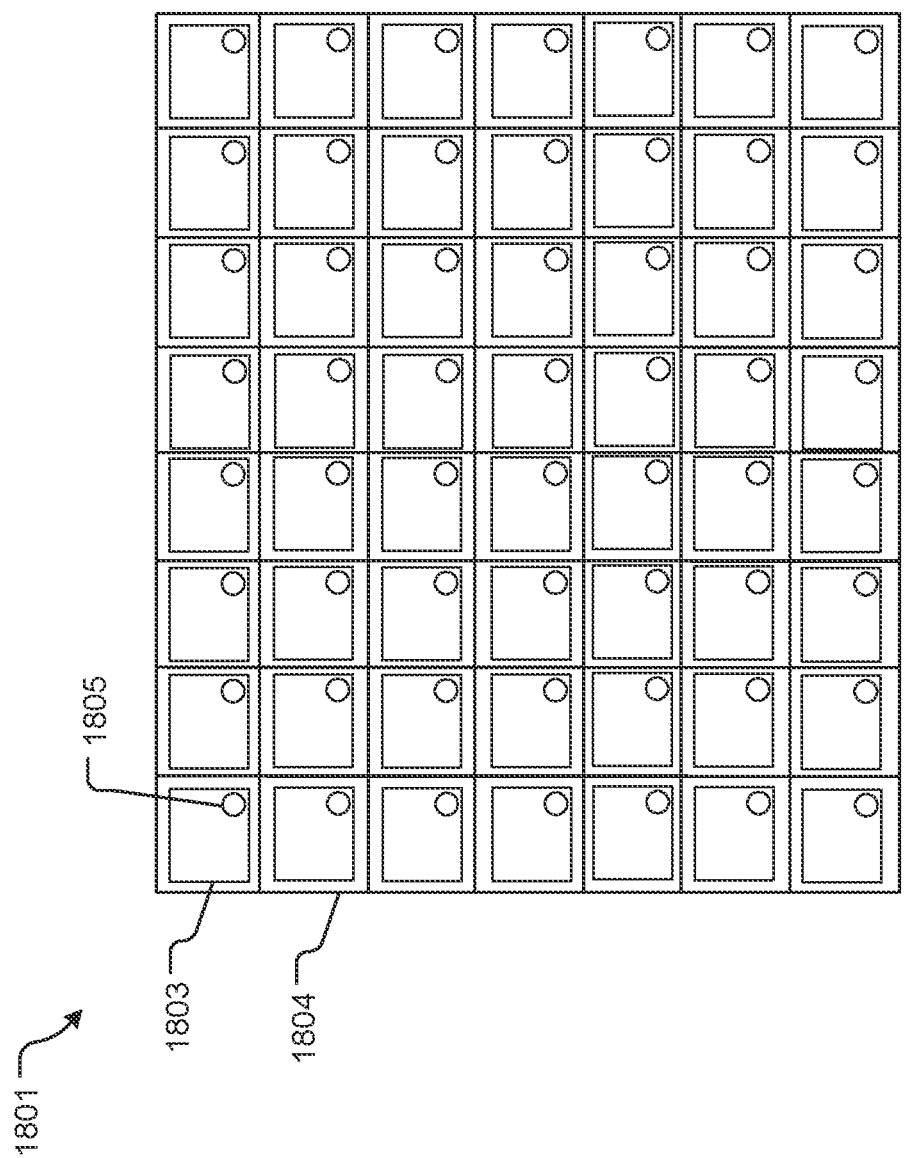
FIG. 18 is a top schematic view of a scanning system of FIG. 15.

In FIG. 18, a schematic depicts a contemplated arrangement of a sensor system 1801 in accordance with the present application. As shown, it is contemplated that a plurality of sensors 1803 can be arranged in a grid pattern 1804 along with a plurality of LEDs 1805. This allows for each sensor to be responsible for the collection of data in only a small area, this data then being used to stitch together the full image. It should be appreciated that the number, density, and the like of the plurality of sensors can vary.

Figure 19:
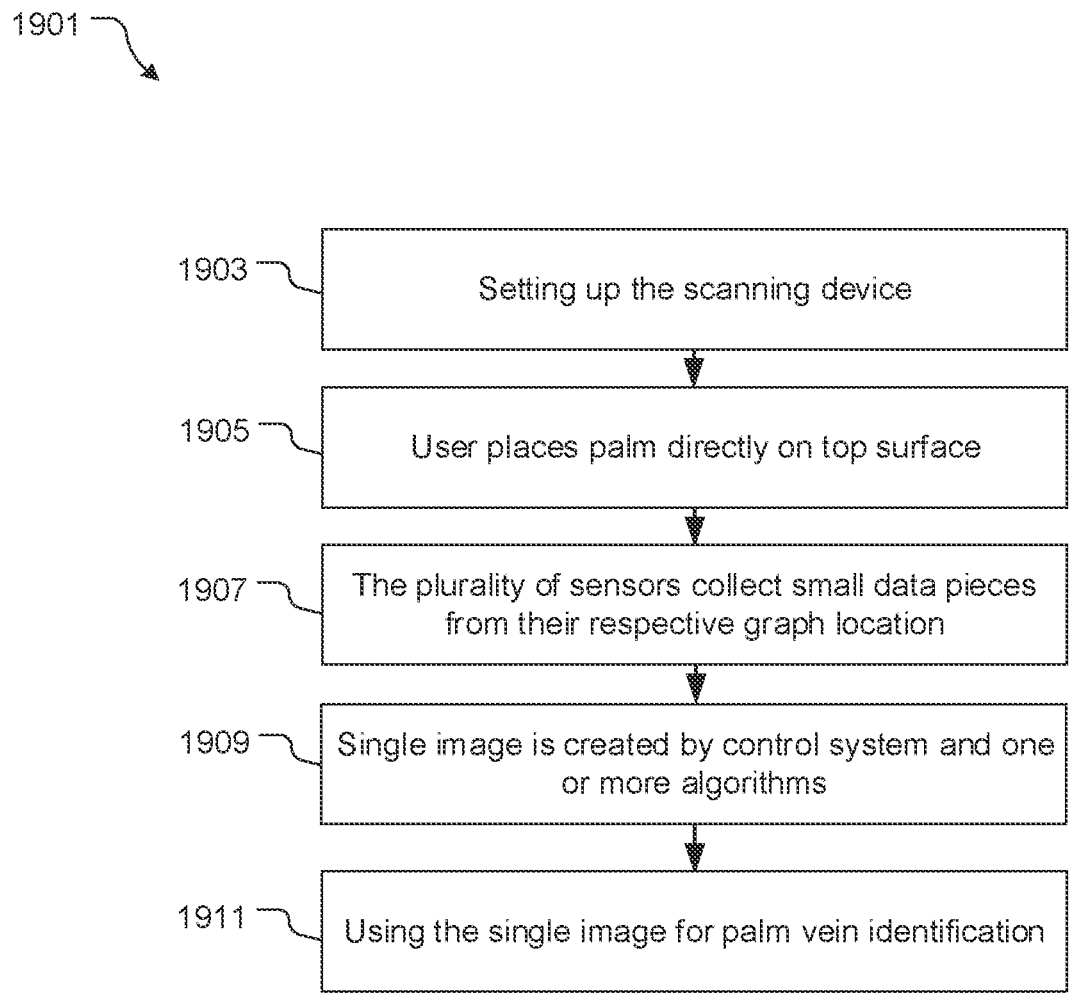
FIG. 19 is a flowchart of a method of use of the system of FIG. 15.

In FIG. 19, a flowchart 1901 depicts the method of use of system 1501. During use, the scanning device is set up, the scanning device having the features discussed above, as shown with box 1903. The user will then approach the device with their palm facing the device and place their palm on the top surface, be it in direct contact with the plurality of sensors or alternatively in contact with another structural component, such as glass, as shown with box 1905. The plurality of sensors will capture small data pieces associated with the respective sensor position, as shown with box 1907. The control system, along with associated algorithms will then stitch together the small pieces of data into a single image, as shown with box 1909. The single image can then be used for palm vein identification and verification, as shown with box 1911.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A palm vein identification system, comprising:
   a palm vein scanning device, the palm vein scanning device having:
      a communication system configured to electronically communicate with a server and a database;
      a lighting unit;
      and a camera;
      wherein the lighting unit and camera are configured to capture a scan of a vein pattern of a candidate;
   the database having a plurality of groups, each group having a plurality of records, each of the plurality of records associated with a candidate record, the plurality of groups including:
      a group of candidates that have scanned at the palm vein scanning device before;
      a group of candidates that have scanned at a specified location before;
      a group of candidates that have scanned within a predetermined distance from the specified location before;
      a group of candidates that have a designated address within the predetermined distance from the specified location before;
      a group of candidates that have a designated GPS location within the predetermined distance from the specified location, as broadcast from a computing device;
      a group of candidates that have a designated WiFi address within the predetermined distance from the specified location;
      a group of candidates that have a designated Bluetooth MAC address within the predetermined distance from the specified location;
      a group of candidates that have a computing device with a unique identifier, the unique identifier being determined to be within the predetermined distance from the specified location; and
      a group of candidates that are determined as likely patrons of the specified location as determined through one or more machine learning algorithms, the machine learning algorithms collecting data from the platform;
   the server having a processing unit configured to perform the steps of:
      receive the scan from the communication system;
      create an image file associated with the scan;
      determine which of the plurality of groups the scan fits into; and
      narrow down a match associated with the scan based on which of the plurality of groups the scan fits into;
   wherein the server authenticates the candidate based on the match.

2. The system of claim 1, wherein the plurality of groups further comprises:
   a group of candidates having been determined to wear similar jewelry;
   a group of candidates having been determined to have similar hand geometry features;
   a group of candidates having been determined to have similar skin tone; and
   a group of candidates having added the specified location to a platform, the platform communicating with the server.

3. A method of palm vein identification, the method comprising:
creating a database having a plurality of groups, each group having a plurality of records, each of the plurality of records associated with a candidate record, the plurality of groups including:
a group of candidates that have scanned at the palm vein scanning device before;
a group of candidates that have scanned at a specified location before;
a group of candidates that have scanned within a predetermined distance from the specified location before;
a group of candidates that have a designated address within the predetermined distance from the specified location before;
a group of candidates that have a designated GPS location within the predetermined distance from the specified location, as broadcast from a computing device;
a group of candidates that have a designated WiFi address within the predetermined distance from the specified location;
a group of candidates that have a designated Bluetooth MAC address within the predetermined distance from the specified location;
a group of candidates that have a computing device with a unique identifier, the unique identifier being determined to be within the predetermined distance from the specified location; and
a group of candidates that are determined as likely patrons of the specified location as determined through one or more machine learning algorithms, the machine learning algorithms collecting data from the platform;
scanning, via a palm vein scanning device, a vein pattern of a candidate to create a scan;
comparing the scan to the plurality of groups;
determining which of the plurality of groups the scan matches with;
narrowing down a match associated with the scan based on which of the plurality of groups the scan fits into; and
authenticating the candidate based on the match.

4. The method of claim 3, wherein the plurality of groups further comprises:
a group of candidates having been determined to wear similar jewelry;
a group of candidates having been determined to have similar hand geometry features;
a group of candidates having been determined to have similar skin tone; and
a group of candidates having added the specified location to a platform, the platform communicating with the server.

* * * * *